United States Patent
McMillen (10) Patent No.: US 7,165,810 B2
(45) Date of Patent: Jan. 23, 2007

(54) LOW COST LEVER ACUTATOR APPARATUS AND METHOD

(75) Inventor: Robert McMillen, Tecumseh (CA)

(73) Assignee: L&P Property Management Company, South Gate, CA (US)

( * ) Notice: Subject to any disclaimer, the term of this patent is extended or adjusted under 35 U.S.C. 154(b) by 340 days.

(21) Appl. No.: 10/856,924

(22) Filed: May 28, 2004

(65) Prior Publication Data

US 2005/0285437 A1   Dec. 29, 2005

(51) Int. Cl.
F16C 1/12 (2006.01)
F16C 1/22 (2006.01)
B60T 7/10 (2006.01)
B64C 13/30 (2006.01)

(52) U.S. Cl. .............. 297/284.4; 74/501.5 R; 74/501.6

(58) Field of Classification Search ......... 74/501.5 R, 74/501.6, 491, 489, 528, 527, 545; 297/284.4
See application file for complete search history.

(56) References Cited

U.S. PATENT DOCUMENTS

| | | | | |
|---|---|---|---|---|
| 4,222,474 A | * | 9/1980 | Choudhury et al. | 477/112 |
| 4,819,501 A | * | 4/1989 | Kraus et al. | 74/538 |
| 5,010,780 A | * | 4/1991 | Hatfield | 74/501.5 R |
| 5,522,639 A | * | 6/1996 | Jaime | 297/184.13 |
| 5,779,316 A | * | 7/1998 | Sugawa et al. | 297/423.26 |
| 6,223,622 B1 | * | 5/2001 | Ficyk et al. | 74/502 |
| 6,334,651 B1 | * | 1/2002 | Duan et al. | 297/284.4 |
| 6,715,828 B1 | * | 4/2004 | Cheng | 297/183.3 |
| 6,957,596 B2 | * | 10/2005 | Kopetzky et al. | 74/501.5 R |
| 6,971,719 B2 | * | 12/2005 | Liu et al. | 297/284.4 |

FOREIGN PATENT DOCUMENTS

| | | |
|---|---|---|
| DE | 40 38 345 C1 | 3/1992 |
| EP | 0 552 904 A1 | 7/1993 |
| EP | 1 300 306 A1 | 4/2003 |
| FR | 2 765 531 A1 | 1/1999 |
| GB | 158063 | 1/1921 |

OTHER PUBLICATIONS

International Search Report; PCT/US2005/018517.

* cited by examiner

Primary Examiner—Peter M. Cuomo
Assistant Examiner—Tania Abraham
(74) Attorney, Agent, or Firm—Husch & Eppenberger LLC; Grant D. Kang; Dennis J. M. Donahue, III (57) ABSTRACT

A simplified, low-cost actuator used in conjunction with a lumbar support device designed to significantly decrease manufacturing costs and assembly time. The present invention produces similar movement as the more expensive actuators but does so with a considerably smaller number of parts. The actuator consists merely of four pieces—a handle, a spring, a plunger, and a mounting bracket. The symmetry of design of this actuator allows it to be installed more easily in any orientation and on either side of the seat. Furthermore, the actuator may be adapted for use with a tension cable or a drive rod. The simplicity, low-cost, and ease of use associated with this actuator makes it an attractive alternative to other actuators disclosed in the prior art. Finally, this actuator allows adjustable lumbar support to be offered in a cost effective manner in lower tier seating.

38 Claims, 8 Drawing Sheets

LOW COST LEVER ACUTATOR APPARATUS AND METHOD

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention relates generally to actuators and, more particularly, to actuators used in connection with lumbar support systems. The invention is generally targeted for use in seats manufactured for the airline and furniture industries but can be used in all types of seating. The lever actuator disclosed herein is designed to provide a simple inexpensive alternative to the actuators normally used in lumbar support systems.

2. Related Art

It is well known in the art to use an actuator to provide movement in a lumbar support device located within a seat frame. Normally, the lumbar support devices are offered in the higher end, more expensive costing seats. For example, seats manufactured for use in automobiles often contain lumbar support systems. However, lower tier seating such as those used in airplanes often do not possess the lumbar support feature because the seats cannot be manufactured in an economical manner. The extra cost associated with adding lumbar support to a seat is in part due to the manufacturing and assembly costs of the actuator used to move the lumbar device. Types of actuators range from complex electric motors to simple turn wheels. Normally, the actuators used in these types of systems are composed of as many as 25 different parts. Such a configuration causes significant labor costs in assembling the actuator as well as extra costs relating to the manufacture of each component. As such, more economically priced seats often fail to offer the lumbar support devices that expensive seats may contain. There is a need in the art for a simple seat actuator that is inexpensive to manufacture and is simple to assemble so that lumbar support may be offered in more economically priced seats.

Also known in the art is a type of actuator that works in a ratcheting type fashion. These actuators employ the use of technology often seen in car braking systems. An example is the actuator disclosed in reference FR2765531. However, these types of actuators are normally complex, employing the use of many different parts. The use of many parts makes the actuator more susceptible to breakdown, especially when used in situations such as an airplane where the seat is subject to significant forces on takeoff and landing. Furthermore, with the ratcheting actuators, the seat occupant lacks the desired feel for the amount of support that will be provided with each pull of the handle. There is a need in the art for a less complex actuator that provides the feel that seat occupants desire.

SUMMARY OF THE INVENTION

It is in view of the above problems that the present invention was developed. The invention is an actuator consisting of only four different pieces. As such, the costs of manufacturing and assembling the lever actuator are significantly less than other options offered in the prior art. The low cost of this actuator allows the lumbar support option to be offered in less expensive types of seating.

There are also advantages of this invention that relate to the actual operation of the lumbar support device. Normally, the actuator is connected to the lumbar support device through the use of a tension cable. The tension cable that is often used in this type of arrangement is a Bowden cable. A Bowden cable consists of a wire with wire ends on each side. The wire slides axially through a wire covering, sometimes referred to as a sleeve or conduit. In order to provide tension, the wire end is normally attached to a moving part while the sleeve is attached to a stationary unit. The moving part extends the wire away from the sleeve, thus creating a corresponding movement of the other wire end relative to the other sleeve end. The movement is used to actuate the lumbar support device. Instead of using a Bowden cable, some actuators are designed to operate in connection with a drive rod. In such instances, the actuator is connected directly to the drive rod such that movement of the actuator is transferred to the drive rod which in turn causes movement within the lumbar system. Often, a piece of the actuator is rotated thus causing the drive rod to rotate in a similar type fashion.

An advantage of this invention is that it can be adapted for use with either a Bowden cable or a drive rod. Such flexibility allows this actuator to be used in a variety of types of lumbar support systems. Furthermore, because of the symmetry of this invention, it can be used on both the right and left sides of the seat. This not only eliminates the need to purchase side specific actuators, it also allows for decreased assembly time and greater flexibility in the mounting placement and configuration within the seat.

A further advantage that this invention possesses over ratcheting type actuators is that it provides superior feel to the seat occupant. As seen in many ratcheting actuators, the user must pull the handle several times to achieve the maximum amount of support offered by the lumbar system. Each time the handle is pulled, however, the user does not know how close it is to maximum support. As such, the user is not aware of the amount of support that will be provided with each pull of the handle. In this invention, however, the handle stays in the position in which it is locked. As such, it gives the seat occupant greater feel for the amount of support that will be received with the movement of the handle and clearly indicates to the user the maximum level of support that will be provided by the lumbar system. In addition, the present invention is simpler than ratcheting type actuators. By employing a fewer number of parts, the chances of breakdown are dramatically decreased.

The invention comprises of only four pieces—a handle, a spring, a mounting bracket, and a plunger. The handle contains a shaft. The plunger is seated within the shaft and runs the length of that shaft. The plunger contains a set of teeth at one end for engaging a gear set located within a mounting bracket. A spring is attached to the plunger such that the spring pushes the set of teeth into the gears. When this occurs, the handle is locked and cannot be rotated to other positions. At the other end of the plunger is a push button. When pressure is applied to the push button, the plunger slides through the shaft and compresses the spring causing the teeth to disengage from the gear set. With the push button pressed, the handle is free to rotate in a clockwise or counterclockwise manner. Once the push button is released, the spring forces the teeth back into the gear set thus locking the handle and preventing its further movement.

The handle is engaged with the mounting bracket such that it will rotate around the bracket in a circular manner. The handle may be rotated in either direction to achieve varying degrees and positions of support. In this invention, rotation of the handle, in either direction, causes movement within the lumbar support device. Such movement is transferred to different parts of the system such that a greater or lesser amount of support is provided to the seat occupant relative to the direction the handle is moved.

As stated earlier, in this invention the handle can be attached to either a Bowden cable or a drive rod. In either type of connection, when the handle is rotated, the movement is transferred to the cable or the shaft thus moving other support components within the lumbar system. In one embodiment of this invention, the handle is connected directly to a drive rod. The drive rod runs horizontally across the seat back and is connected to the seat frame such that the rod can still rotate as the handle is moved. The rod has springs attached to it in such a manner that when the handle is moved in one direction, the springs push on the lower portion of the seat providing additional lower back support, and when the handle is moved in the opposite direction, the springs push on the upper portion of the seat providing additional upper back support. When the handle is moved to a middle position, the springs provide additional middle back support.

Further features and advantages of the present invention, as well as the structure and operation of various embodiments of the present invention, are described in detail below with reference to the accompanying drawings.

BRIEF DESCRIPTION OF TIE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
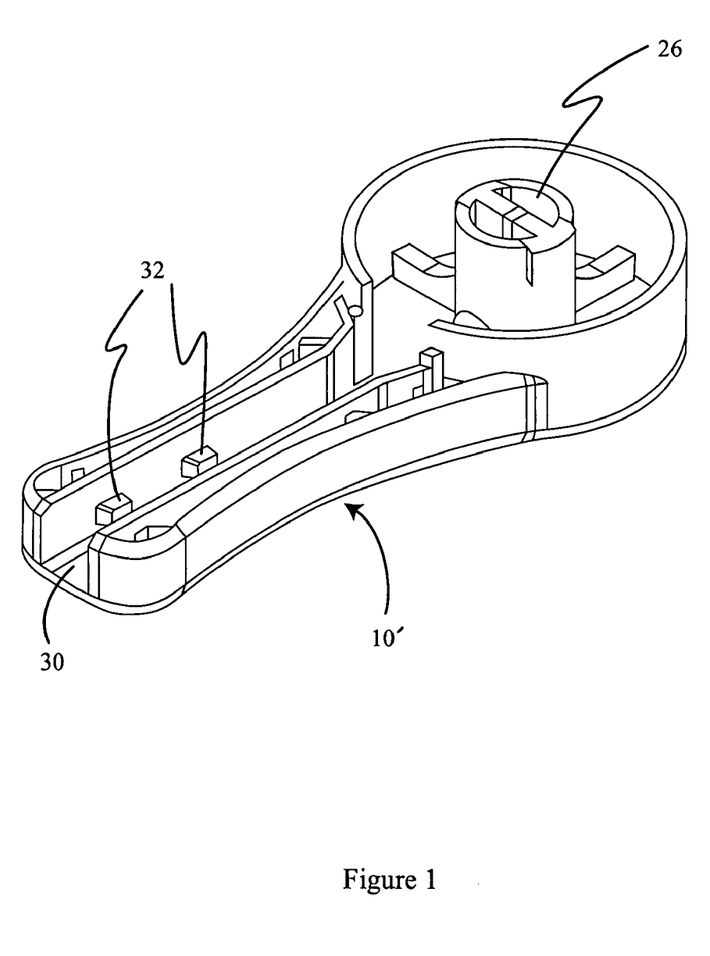
FIG. 1 is a perspective view of the handle portion of the lever actuator apparatus of the present invention.
Figure 1B:
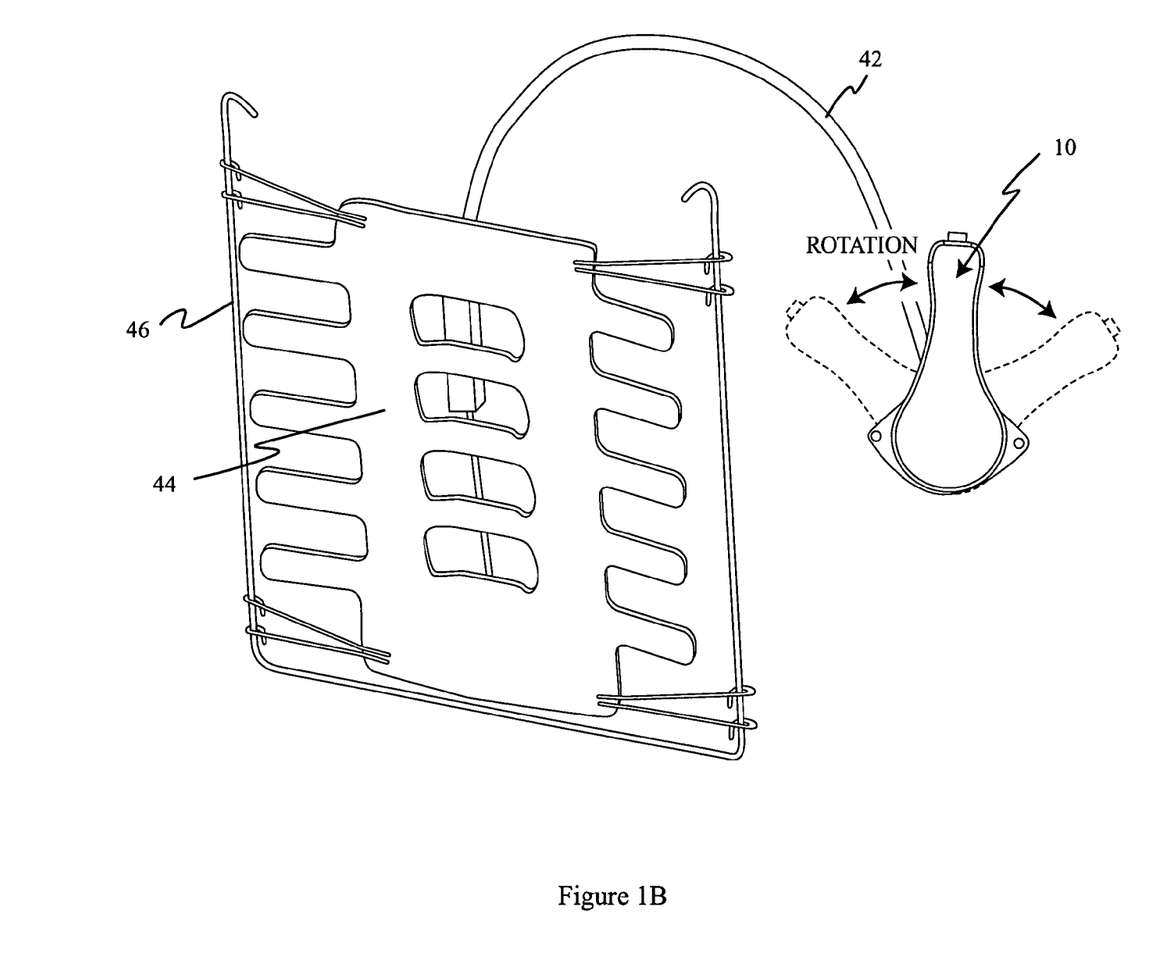
FIG. 1B is a side elevational view of the apparatus of the invention, reduced, connected to a lumbar support system.
Figure 5:
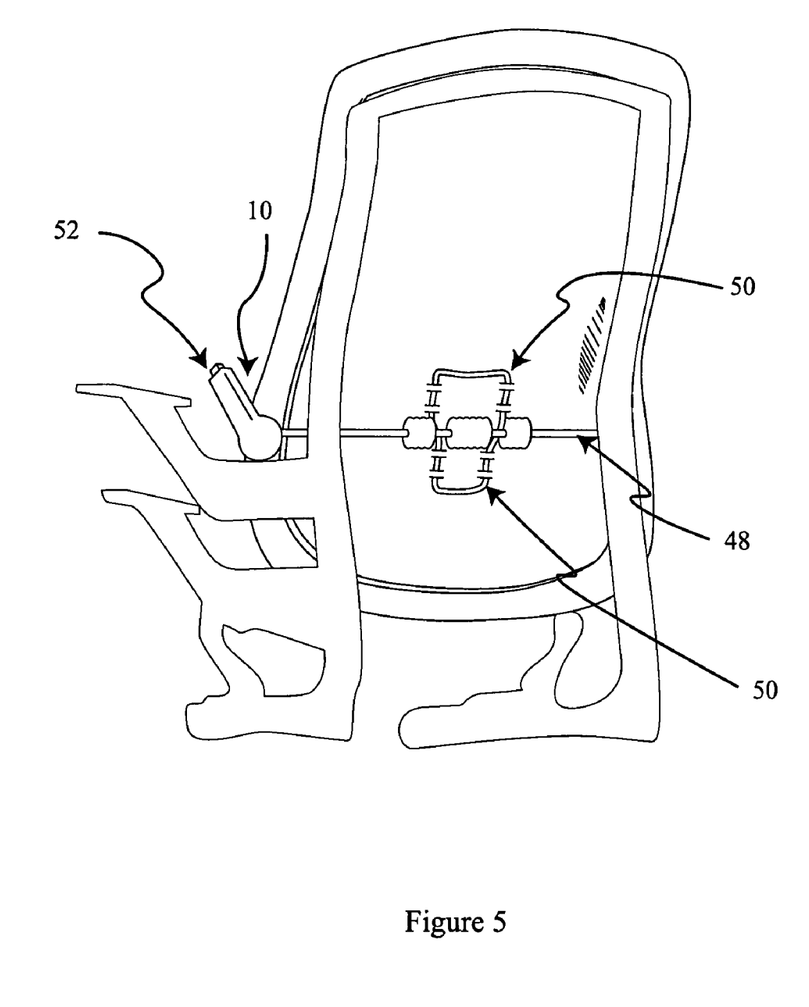
FIG. 5 is a perspective view of a seat employing a lumbar support system with a drive rod connected to the lever actuator apparatus of the present invention.

Referring to the accompanying drawings in which like reference numbers indicate like elements, there are shown different components of the present invention. The new lever actuator apparatus is indicated generally at 10. FIG. 1A shows the different aspects of a portion of the new actuator 10, i.e. handle 10'. The handle 10' possesses a shaft 30 running from the top (at the left side of FIG. 1) of the handle to the circular base. This shaft 30 generally runs down the portion of the handle 10' facing the seat. In this embodiment, the shaft 30 is defined by only three walls on the interior of the handle 10'. However, in other embodiments, the shaft 30 may be completely enclosed within the interior of the handle 10'. Two pegs 32 are located on two of the three sides of the interior of the shaft 30. These pegs 32 are used to connect the plunger 12 (seen in FIGS. 2A and 2B) to the handle 10'. In the center of the circular base of the handle 10' is an attachment piece 26. The attachment piece 26 provides the connection point for the drive rod 48 or the tension cable 42. FIG. 1B is an illustration of the handle lever actuator apparatus 10 in connection with a tension cable 42 such as a Bowden cable. The tension cable 42 may be attached in any way that is known in the art for attachment of a tension cable to an actuator. It is also recognized that the tension cable 42 may be replaced by a drive rod 48 as shown in FIG. 5. FIG. 1B also illustrates that lumbar support system. The lumbar system generally contains a support surface 44 and a guide 46. The guide 46 mediates travel of the support surface 44 from a non-supporting position to a supporting position, or vice versa. Movement is provided through the use of tension cable 42 operatively engaged to the support surface 44 and the guide 46.

Figure 2A:
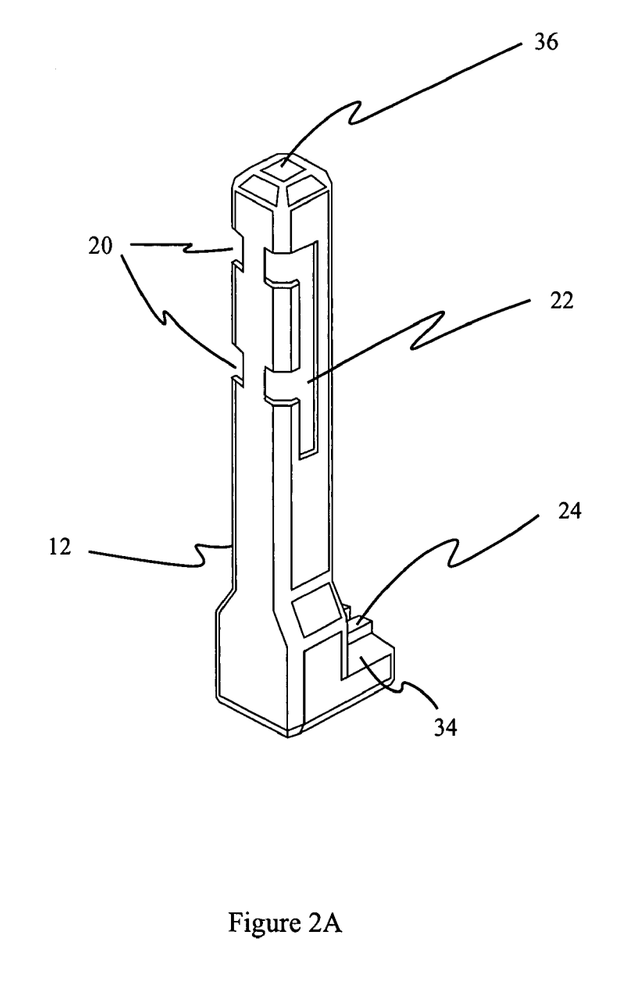
FIG. 2A is a perspective view of the plunger of the plunger of the lever actuator apparatus of the present invention.
Figure 2B:
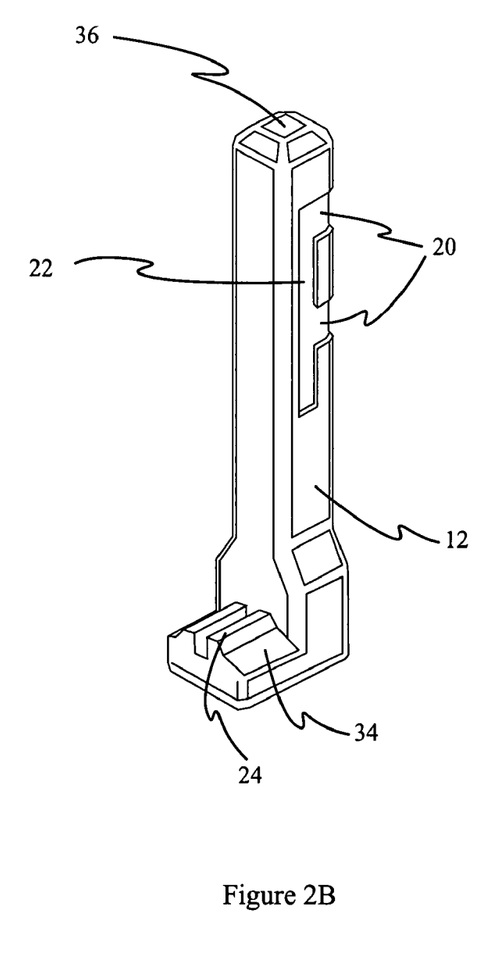
FIG. 2B is an opposite angle perspective view of the plunger of the lever actuator apparatus of the present invention.

FIGS. 2A and 2B show perspective views of the plunger 12. The plunger is slightly longer than the shaft 30 in length. One end of the plunger 12 contains a platform 34 possessing a set of teeth 24. When assembled, the platform 34 and teeth 24 extend into the circular base of the handle 10'. The underside of the platform 34 possesses a spring attachment area 28. The attachment area 28 may take a variety of forms but this embodiment merely possesses a recessed area of corresponding size with the diameter of the spring 14.

The teeth 24 located on the platform 34 are designed to engage a gear set 18. This engagement keeps the handle 10' in a fixed position and prevents it from rotating unintentionally. On the opposite end of the plunger 12 is a push button 36. When assembled, this push button 36 extends through the top of the shaft 12 and extrudes out from the top of the handle 10'. The push button 36 provides the surface area in which force may be applied to move the plunger 12 within the shaft 30. Somewhere between the push button 36 and the platform 34 is a groove 22. This embodiment features two grooves 22, each running parallel with the shaft 30 along two sides of the plunger 12. Access to the grooves 22 may be obtained through two slots 20 located at various lengths along the groove 22. In this embodiment, the slots 20 are located at the top of the groove 22 relative to the push button 36 and somewhere near the midpoint of the groove 22. The position of these slots 20 are ideally placed when the pegs 32 located within the shaft 30 may gain easy access to the groove 22 but that future exit from the groove 22 will not easily be obtained once the spring 14 is engaged with the platform 34. The groove 22 is designed in such a manner than when the pegs 32 are inserted into the groove 22, the plunger 12 is only able to slide through the shaft 30 a distance equal to the length of the groove 22. Furthermore, the groove 22, in combination with the pegs 32, prevents the plunger 12 from completely exiting the shaft 30 once the force exerted by the spring 14 is applied.

Figure 3:
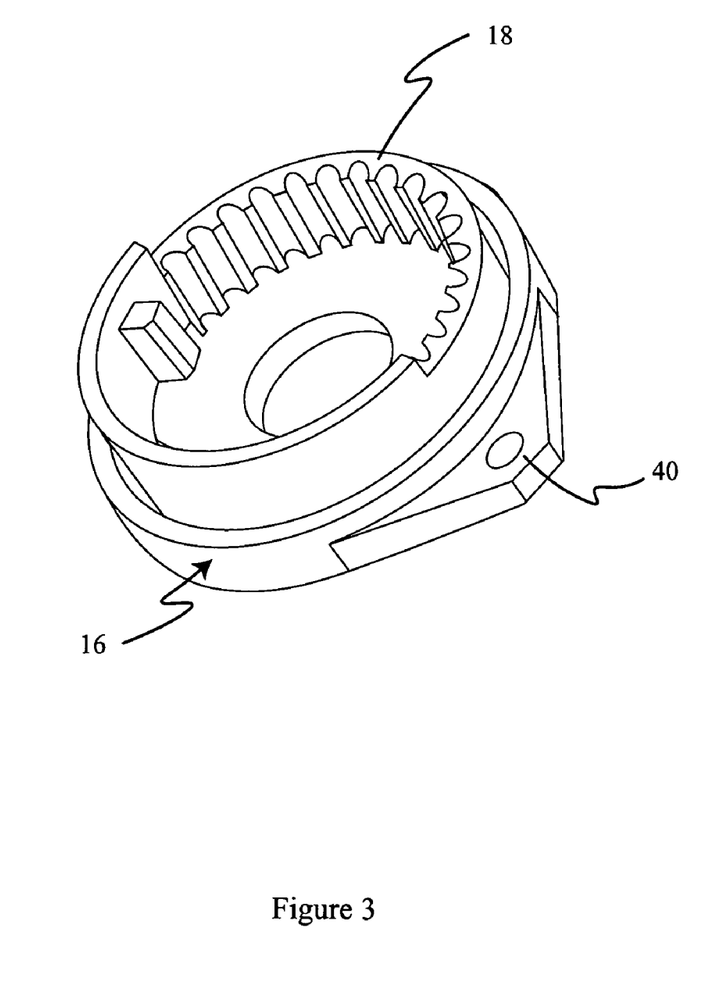
FIG. 3 is a perspective view of the mounting bracket of the lever actuator apparatus of the present invention.

FIG. 3 is a perspective view of the mounting bracket 16. The mounting bracket 16 possesses a gear set 18 in its interior portion through which the teeth 24 of the plunger 12 may attach. While in this embodiment the gear set 18 only extends partially along the interior of the mounting bracket 16, other embodiments may contain gear sets 18 extending throughout the entire interior of the mounting bracket 16. The mounting bracket 16 is generally shaped in a circular fashion to correspond with the circular base of the handle 10'. However, the mounting bracket 16 may take any shape such that it contains a gear set 18 for engagement of the teeth 24. The mounting bracket 16 also has two flanges 40 with holes for anchoring screws so that the unit may be mounted on a seat frame. Finally, the mounting bracket 16 contains an opening such that the attachment piece 26 of the handle 10' may extend through the opening and connect with either the Bowden cable 42 or the drive rod 48 of a lumbar support system.

Figure 4:
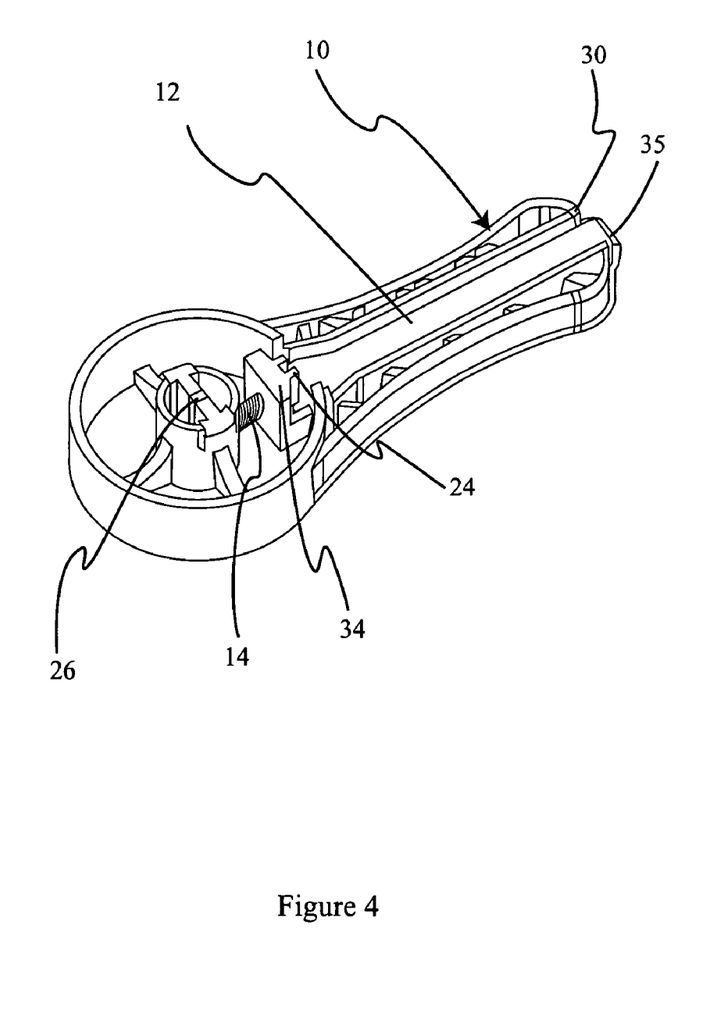
FIG. 4 is a perspective view of the lever actuator apparatus of the present invention, assembled.
Figure 4A:
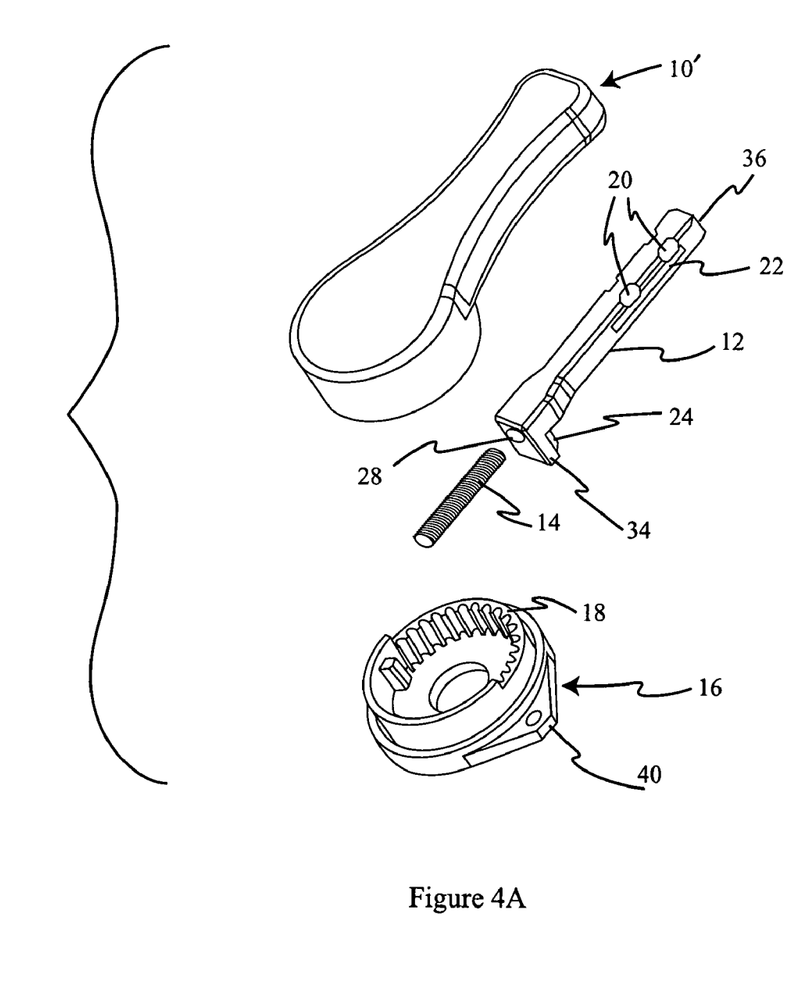
FIG. 4A is an exploded view of the apparatus shown in FIG. 4, upside down.

FIG. 4 shows the actuator apparatus 10 with plunger 12, handle 10', and spring 14 in assembled configuration. FIG. 4A shows the apparatus as it is being assembled. During the assembly process, the plunger 12 is placed within the shaft 30 of the handle 10'. The plunger 12 is connected to the handle 10' through the use of pegs 32. The pegs 32 are inserted into the groove 22 via the slots 20. Once the pegs 32 are inserted into the slots 20, they enter the groove 22 and may travel the length of the groove 22 without easily exiting the slots 20. Once the pegs 32 are inserted into the groove 22, the spring 14 is compressed and attached to the spring attachment area 28 located on the underside of the platform 34. This connection may be made in a variety of ways but in this embodiment, the spring 14 is merely placed between the attachment piece 26 and the spring attachment area 28. In this embodiment, the spring 14 generally acts as a resilient compression piece, and it will be appreciated that any type of spring or its equivalent, including any type of compression piece, can be used in the present invention. When released, the spring 14 pushes the plunger 12 to a position such that the bottom set of pegs 32 engage the lower end of the groove 22 relative to the push button 36.

In order to complete assembly, the handle 10' is placed onto the mounting bracket 16. Pressure is applied to the push button 36 forcing the plunger 12 to slide down the shaft 30 and compress the spring 14. The handle 10' is then placed on the mounting bracket 16 such that when the push button 36 is released, the spring 14 will push the plunger 12 up the shaft 30 and the teeth 24 will become engaged with a portion of the gear set 18.

Operation of this actuator is also very simple. When the seat occupant desires a change in the amount of lumber support being provided, the occupant merely needs to press down upon the push button 36. Such force moves the plunger down the shaft 30 compressing the spring 14. At this point, the teeth 24 have been disengaged from the gear set 18. The occupant then may rotate the handle 10' in a clockwise or counterclockwise direction to adjust the level of support being provided. Once the desired support is being received, the occupant merely releases the push button 36 and the spring 14 forces the plunger 12 up the shaft 30 and the teeth 24 become engaged with a different portion of the gear set 18. When the teeth 24 become engaged with the gear set 18, the handle 10' is prevented from moving and thus the support being received will be maintained.

FIG. 5 shows another embodiment of a lumbar system using a drive rod 48 instead of a tension cable. The drive rod 48 is connected to the actuator 52 and the seat frame. The rod 48 has springs 50 attached to it in such a manner that when the handle 10' is moved in one direction, the springs push on the lower portion of the seat providing additional lower back support, and when the handle is moved in the opposite direction, the springs 50 push on the upper portion of the seat providing additional upper back support.

In view of the foregoing, it will be seen that the several advantages of the new lever actuator apparatus are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, even though this actuator is primarily intended to be used in conjunction with lumbar support devices for seats used in the airline and furniture industries, it can be used to provide actuation in any type system employing the use of a tension cable or a drive rod. Similarly, as discussed above, any type of spring or other compression device can be used in the present invention, such as a shock. Thus, the breadth and scope of the present invention should not be limited by any of the above-described exemplary embodiments, but should be defined only in accordance with the following claims appended hereto and their equivalents.

What is claimed is:

1. A low cost lever actuator comprising:
    a handle having a shaft and an attachment piece,
    a plunger located within said shaft having a first end and a second end, said first end containing a push button and said second end containing a set of teeth;
    a spring in communication with said plunger;
    a mounting bracket having a gear set; and
    an adjustable lumbar support operably attached to the handle;
    whereby said spring exerts force upon said plunger such that said set of teeth communicate with said gear set of said mounting bracket thus preventing movement of said handle;
    wherein movement of the handle adjusts the lumbar support.

2. The actuator of claim 1, wherein said plunger has a platform containing a set of teeth.

3. The actuator of claim 1, wherein said platform contains a spring attachment area.

4. The actuator of claim 3, wherein said spring attachment area is a recessed area.

5. The actuator of claim 1, wherein said plunger contains a groove along at least one side.

6. The actuator of claim 5, wherein said groove contains at least one slot.

7. The actuator of claim 6, wherein at least one peg located within said shaft is inserted into said grove through said slot.

8. The actuator of claim 5, wherein said shaft contains at least one peg.

9. The actuator of claim 8, wherein said peg is designed for insertion into said groove.

10. The actuator of claim 1, wherein said spring is a compression piece.

11. The actuator of claim 1, wherein said gear set is located on the interior of said mounting bracket.

12. The actuator of claim 1, wherein said actuator is adapted to actuate a tension cable.

13. The actuator of claim 1, wherein said actuator is adapted to actuate a tension cable that is a Bowden cable.

14. The actuator of claim 1, wherein said actuator is adapted to actuate a drive rod.

15. The actuator of claim 1, wherein said attachment piece is adapted for connection with a Bowden cable.

16. The actuator of claim 1, wherein said attachment piece is adapted for connection with a drive rod.

17. A lumbar support device for a seat comprising:
   a support surface that translates between a first, non-supporting position and a second supporting position;
   a tension cable comprising a wire disposed to slide axially through a sleeve, said wire having a first end and a second end and said sleeve having a first end and a second end and said first end of said wire and said first end of said sleeve being operatively engaged with said support surface;
   a handle having a shaft and an attachment piece connected to a portion of said tension cable;
   a plunger located within said shaft having a first end and a second end, said first end containing a push button and said second end containing a set of teeth;
   a spring in communication with said plunger; and
   a mounting bracket having a gear set;
   whereby said spring exerts force upon said plunger such that said set of teeth communicate with said gear set of said mounting bracket thus preventing movement of said handle.

18. The lumbar support device of claim 17, wherein said plunger has a platform containing a set of teeth.

19. The lumbar support device of claim 17, wherein said platform contains a spring attachment area.

20. The lumbar support device of claim 19, wherein said spring attachment area is a recessed area.

21. The lumbar support device of claim 17, wherein said plunger contains a groove along at least one side.

22. The lumbar support device of claim 21, wherein said groove contains at least one slot.

23. The lumbar support device of claim 22, wherein at least one peg located within said shaft is inserted into said grove through said slot.

24. The lumbar support device of claim 21, wherein said shaft contains at least one peg.

25. The lumbar support device of claim 24, wherein said peg is designed for insertion into said groove.

26. The lumbar support device of claim 17, wherein said spring is a compression piece.

27. The lumbar support device of claim 17, wherein said gear set is located on the interior of said mounting bracket.

28. A lumbar support device for a seat comprising:
   a support surface that translates between a first, non-supporting position and a second supporting position;
   a drive rod being operatively engaged with said support surface;
   a handle having a shaft and an attachment piece being engaged with said drive rod;
   a plunger located within said shaft having a first end and a second end, said first end containing a push button and said second end containing a set of teeth;
   a spring in communication with said plunger; and
   a mounting bracket having a gear set;
   whereby said spring exerts force upon said plunger such that said set of teeth communicate with said gear set of said mounting bracket thus preventing movement of said handle.

29. The lumbar support device of claim 28, wherein said plunger has a platform containing a set of teeth.

30. The lumbar support device of claim 28, wherein said platform contains a spring attachment area.

31. The lumbar support device of claim 30 wherein said spring attachment area is a recessed area.

32. The lumbar support device of claim 28, wherein said plunger contains a groove along at least one side.

33. The lumbar support device of claim 32, wherein said groove contains at least one slot.

34. The lumbar support device of claim 33, wherein at least one peg located within said shaft is inserted into said grove through said slot.

35. The lumbar support device of claim 32, wherein said shaft contains at least one peg.

36. The lumbar support device of claim 35, wherein said peg is designed for insertion into said groove.

37. The lumbar support device of claim 28, wherein said spring is a compression piece.

38. The lumbar support device of claim 28, wherein said gear set is located on the interior of said mounting bracket.

* * * * *